Oct. 11, 1932.  H. G. WEDLER  1,882,169
SEAT COVER
Filed April 15, 1929  3 Sheets-Sheet 3
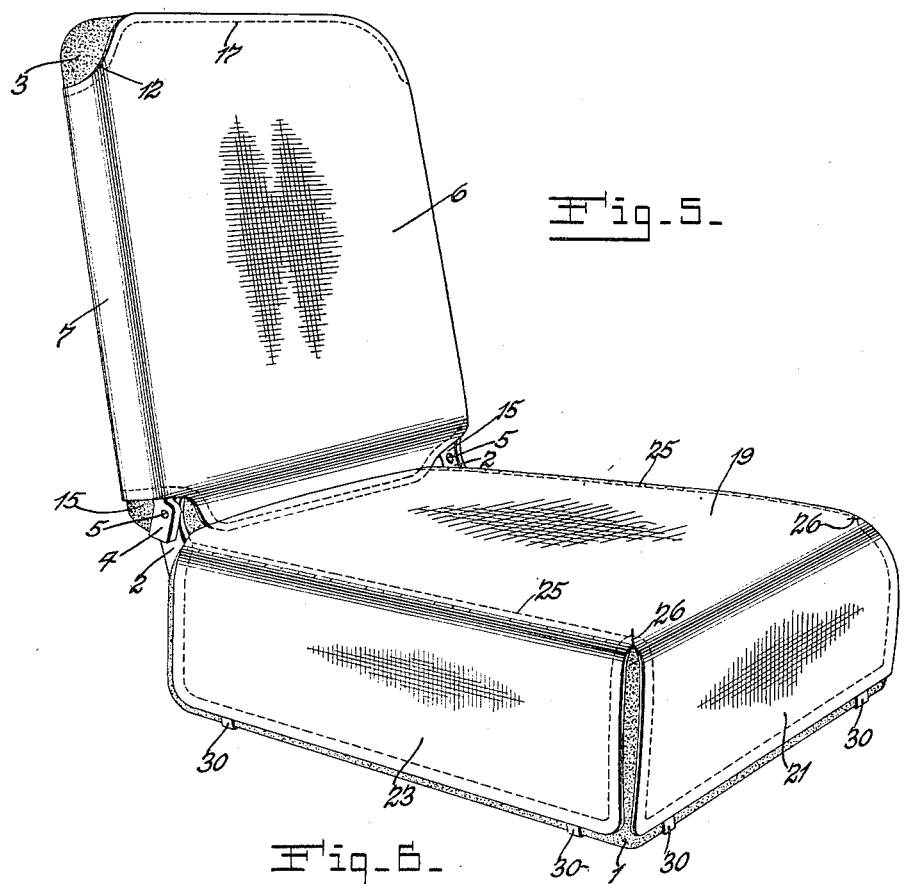
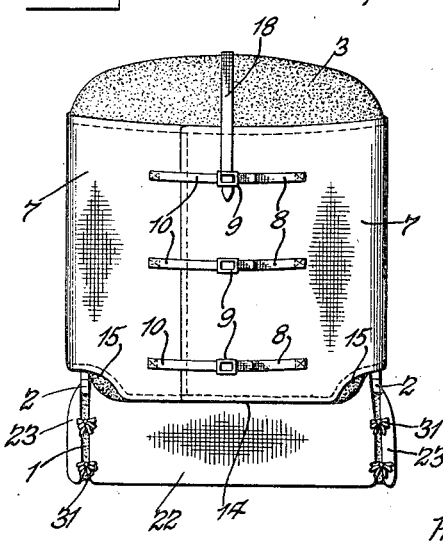
Inventor.
Harry G. Wedler,
by Rippey & Kingsland
His Attorneys.

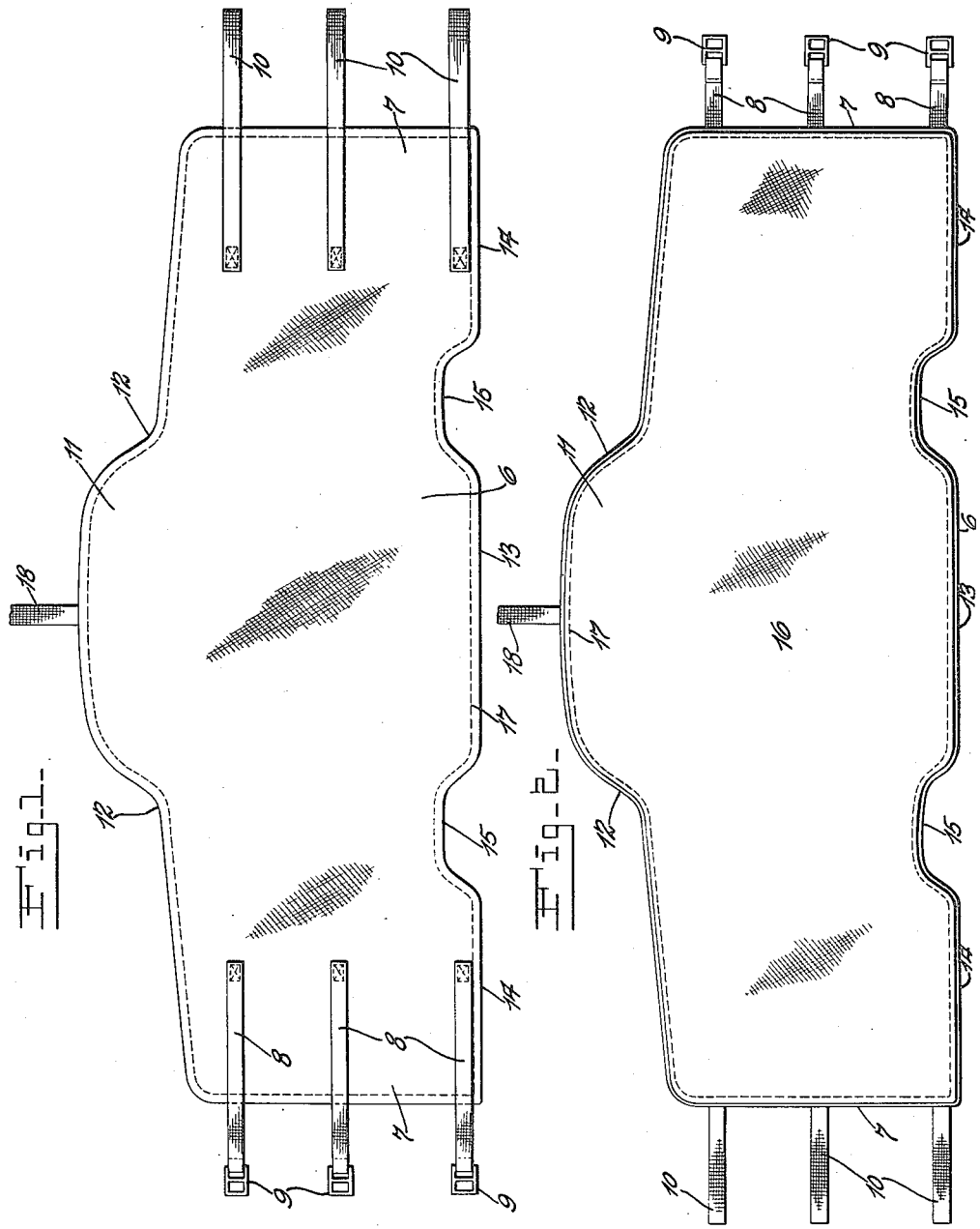

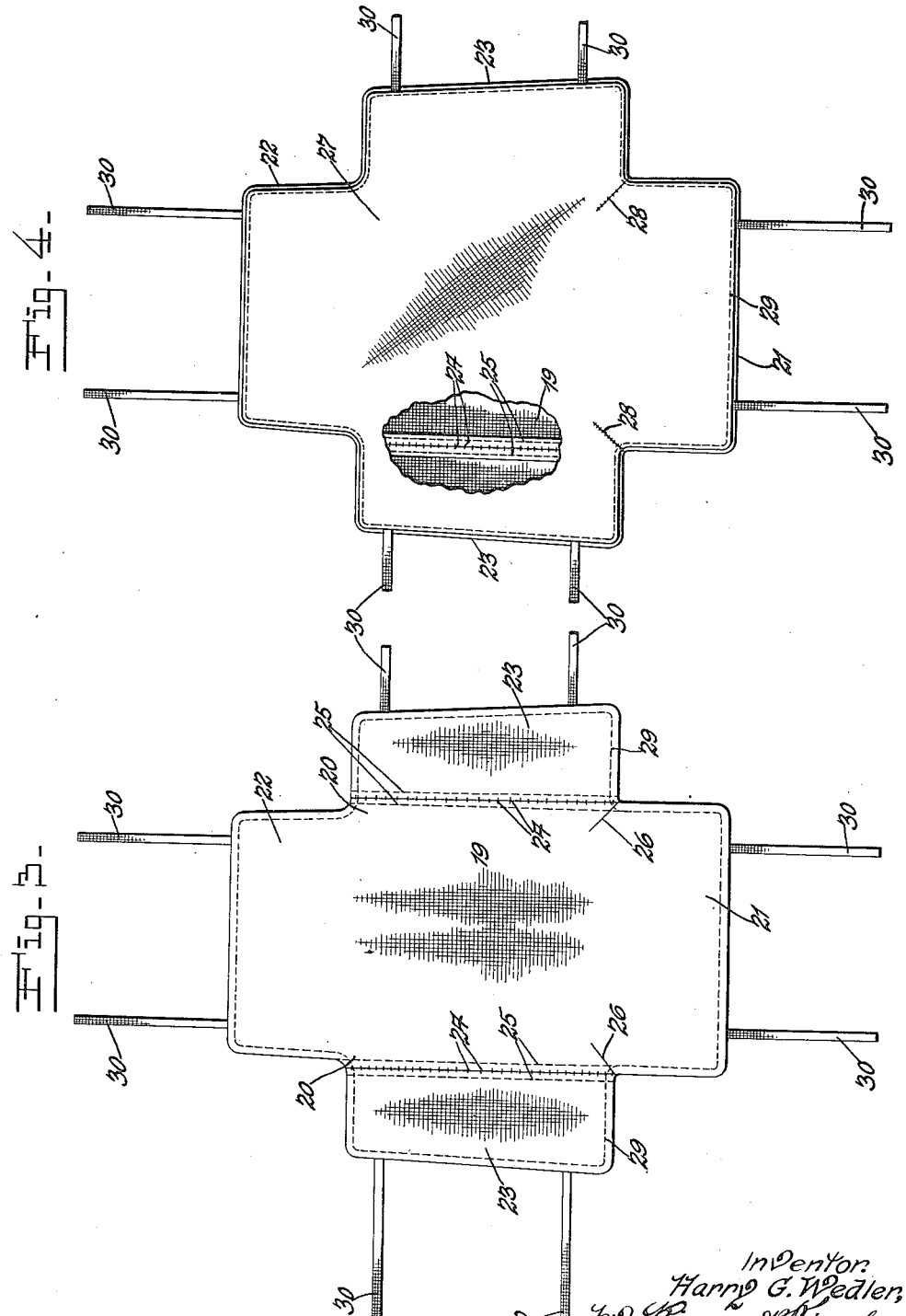

Patented Oct. 11, 1932

1,882,169

UNITED STATES PATENT OFFICE

HARRY G. WEDLER, OF ST. LOUIS, MISSOURI, ASSIGNOR TO THE WEDLER-SHUFORD CO., OF ST. LOUIS, MISSOURI, A CORPORATION OF MISSOURI

SEAT COVER

Application filed April 15, 1929. Serial No. 355,311.

This invention relates to seat covers.

An object of the invention is to provide an improved seat cover comprising a seat covering member for application to a seat or seat cushion and having a central portion of a size properly to cover the upper side of the seat or seat cushion and provided with flaps for enclosing the sides of the seat or seat cushion and embodying a novel construction and arrangement for obtaining nice and proper fit upon and about the seat or seat cushion.

Another object of the invention is to provide an improved seat cover comprising a back member constructed and arranged for application on and about a seat back and having efficient means for retaining proper position thereon.

Another object of the invention is to provide a seat cover capable of satisfactory use in connection with seats of the type having hinged backs and permitting satisfactory attachment of the seat cover to the seat and back portions of the seat without interfering with the freedom of pivotal movement of the back.

Other objects will appear from the following description, reference being made to the drawings in which Fig. 1 is an outside plan view of the back covering member of my improved seat cover.

Fig. 2 is a view showing the inner side.

Fig. 3 is an outside plan view of the member for covering the seating portion of the seat.

Fig. 4 is an inside plan view.

Fig. 5 is a perspective view of a seat having my improved cover applied thereto.

Fig. 6 is a rear elevation of the seat.

The seat in connection with which I have shown the present invention and for which this invention is specially designed includes a seat cushion or member 1 having upwardly projecting rigid arms 2 near its rear corners. The back member 3 has rigid therewith downwardly extended arms 4 located at the sides of the arms 2 and connected therewith by pivots 5. The cooperative relationship of these parts is such that the back member 3 may be swung forwardly and laid upon the seat or cushion 1 or raised to approximately vertical position in which it will be firmly supported by the cooperative relationship of the pivotally connected arms 2 and 4, as is familiar. A purpose of the present invention is to provide improved covers for the seat or cushion 1 and for the back member 3 which may be detachably secured thereto and which will protect said parts and the clothes of the user without interfering in the least with the freedom of operation of the back member 3. This purpose is satisfactorily accomplished.

The back of my improved seat cover may include both a facing and a lining or backing made of proper shape and size and secured together in cooperative relationship so that said back covering member may be readily and satisfactorily applied to the hinged seat back for which it is designed and intended. Preferably, though not essentially, the facing is a textile and the lining or backing may also be made of a textile fabric or of other appropriate material. For the facing I have found that a textile having woof and warp elements about the size of the straws of straw matting is highly satisfactory, but I do not restrict myself to the use of such material. This material, however, possesses advantages because it is pliable enough for its intended purpose and will retain a smooth shape and condition better than ordinary textile cloth and is more easily cleaned. In mentioning these several advantages I have not attempted to mention all. In connection with this improved material I have found that a cloth backing or lining is satisfactory and adds proper strength and reinforcement to the back. However made and whatever material is comprised therein the back member is flexible and pliant and may possess a slight degree of resiliency but is substantially non-elastic.

In the embodiment shown the facing of the back covering member comprises a textile body 6 of a size sufficient to "cover properly the front of the back member 3 and having at each end an elongation or extension 7 projecting laterally or endwise beyond the lateral ends of the body 6 sufficiently to extend rearwardly across the side edges of the back member 3 and to fold inwardly at the rear of said back member 3 to overlapped relationship (Fig. 6). One of the extensions 7 has attached thereto a number of straps 8 equipped with buckles or catches 9 for engagement with a corresponding series of straps 10 attached to the other extension. These buckles 9 may be of the friction type for more precise and accurate adjustment. The body 6 is of considerably greater vertical width than the width of the extensions 7, such greater vertical width being obtained by an upward extension 11 of the body which extends to the upper edge of the back member 3. The side edges of the extension 11 merge with the upper edges of the extensions 7 by ogee curves 12. Thus the extensions 7 are of sufficient width to extend around to the rear side of the back member 3 of the seat but do not rise above the rounded upper portions of said back member so that no pockets are formed, as would be the case if the upper edges of the extensions 7 extended above any portions of the rounded corners 3. Such pockets would be objectionable because they would form catches or receptacles in which dirt and other foreign substances would become lodged.

Preferably the lower edge 13 of the body portion 6 is alined with the lower edges 14 of the extensions 7 but is defined therefrom by relatively wide notches 15 of sufficient width and depth to avoid interference with the hinges above described by which the back member is attached to the seat member.

The lining or backing comprises a section 16 of cloth or other material appropriate for such purpose having the same shape as the facing. The marginal edges of the facing and the backing are folded inwardly and the marginal portions of the facing and backing are permanently attached together by a line of stitches 17 passing through said folded portions. The edge of the backing or lining is covered by the marginal portion of the facing; that is to say, the lining or backing does not extend entirely to the edge of the facing so that only the facing is visible when the device is in use.

A strap 18 is attached to the extension 11 of the body 6 and passes over the upper end of the back member 3 of the seat and engages with one of the buckles or fasteners 9 (Fig. 6). In this way a good fit of the back covering member is maintained and said back covering member is held from working from proper position.

The covering member for the seat 1 comprises a body 19 having on each lateral side a short extension 20. A forward extension 21 of the seat covering member constitutes a drop to extend downwardly at the front of the seat 1; and the rear extension 22 is designed and adapted to extend downwardly at the rear of the seat 1. A flap 23 is attached to each of the extensions 20 by a row of stitches 24, the adjacent marginal edges of the extensions 20 and the flaps 23 being folded apart and held flat by rows of stitches 25. The body 19 at the corners formed by the intersection of the front ends of the flaps 23 with the side edge of the extension 20 is folded and sewed to form darts 26 whereby neat fit is obtained at the front corners of the seat 1.

This device is provided with a lining or backing comprising a sheet 27 of cloth or other material appropriate for such purpose formed with sewed plaits or darts 28 matching the darts 26. The marginal edges of the facing and of the lining or backing are turned inwardly and the marginal portions of said two members are secured together by a row of stitches 29 passing through the inwardly folded portions of said parts. A pair of straps 30 is attached to each of the ends 21 and 22 and to each of the flaps 23 for the purpose of extending under the seat 1 for attachment to hold the device in position thereon. All or any of the parts of the facing may be made of textile fabrics. Particularly I have found that the textile fabric having woof and warp elements about the size of the straws of straw matting is highly satisfactory, as such material possesses the desirable quality and characteristic of pliability and flexibility and a sufficient degree of resiliency and smoothness of surface to obtain best results. A lining of cloth or the like strengthens the device. The rear edges of the flaps 23 may, if desired, be attached to the side edges of the rear extension 22 by fasteners 31.

From the foregoing it is apparent that my invention comprises a seat covering member and a back covering member of novel and highly satisfactory construction and arrangement and which may with complete satisfaction be applied to a seat having a hinged back member; that said parts are flexible and readily adjust and adapt themselves to fit properly upon the seat elements; that they are arranged and applied to the seat elements in such a way as to make it impossible for said parts to work loose or to roll up when the passengers leave or enter the seat; and that said seat covering member and said back covering member cooperate to provide all the cover that is needed for the seat and back. The advantages of this device must be clear from the preceding description and the annexed drawings and it is obvious to those skilled in the art that the device may be varied within equivalent limits without departure from the nature and principle of the invention. By making the device in detached parts, that is to say, by making the back covering member and the seat covering member separate and unattached (or at least detachable), either can be used independently of the other or both can be used in cooperative relationship as herein described.

I do not restrict myself in any unessential respects, but what I claim and desire to secure by Letters Patent is:—

1. A cover for a seat back that has downwardly extended supports near its side edges and an uninterrupted space between said supports comprising a body extending entirely around said back and enclosing the front, rear and sides and having its ends at the rear of said back and having notches in its lower edge receiving said supports, the lower edge of said body between said notches at the front and beyond said notches at the rear being approximately even with the lower end of said back, and detachable means connecting the ends of said body.

2. A cover for a seat back that has spaced supporting members extending downwardly therefrom comprising a body of flexible and pliable material extending entirely around said back and having its lower edges at the front and rear approximately even with the lower end of said back and having spaced notches in its lower edge receiving said supports, means securing together the ends of said body at the rear of said back, and a device supporting said body around the back.

HARRY G. WEDLER.